United States Patent [19]

Huwald et al.

[11] 4,384,683
[45] May 24, 1983

[54] METHOD OF RECOVERING LEAD AND LEAD COMPOUNDS FROM DISCARDED LEAD STORAGE BATTERIES

[75] Inventors: Eberhard Huwald; Rolf König, both of Münster, Fed. Rep. of Germany

[73] Assignee: Hazemag Dr. E. Andreas GmbH & Co., Münster, Fed. Rep. of Germany

[21] Appl. No.: 242,476

[22] Filed: Mar. 11, 1981

[30] Foreign Application Priority Data

Jun. 18, 1980 [DE] Fed. Rep. of Germany ....... 3022665

[51] Int. Cl.³ .................. B02C 19/12; B02C 21/00
[52] U.S. Cl. .................................. 241/19; 241/23; 241/24; 241/27
[58] Field of Search ............ 241/14, 16, 18, 20, 241/21, 23, 24, 27, 29, 76, 77, 78, 79.1, 19

[56] References Cited

U.S. PATENT DOCUMENTS 3,493,183 2/1970 Fischer et al. .............. 241/24
3,777,994 12/1973 Fischer ....................... 241/24
4,113,187 9/1978 Hoppen et al. ............. 241/24

FOREIGN PATENT DOCUMENTS 633236 12/1961 Canada ....................... 241/24
1224935 9/1966 Fed. Rep. of Germany .
2245196 3/1973 Fed. Rep. of Germany .

Primary Examiner—Mark Rosenbaum
Attorney, Agent, or Firm—Michael J. Striker

[57] ABSTRACT

Scrapped storage batteries are first preliminarily crushed to discharge acid from individual cells, thereupon rinsed by alkaline water, crushed in a hammermill and simulataneously dried by a stream of hot air; non-crushed lead pieces are discharged separately from the hammermill and the remaining crushed material is discharged in dry condition from the mill and classified into two fractions, namely a coarse lead fraction and a second fraction consisting of fine particles of lead compounds mixed with coarser pieces of plastic material.

10 Claims, 1 Drawing Figure

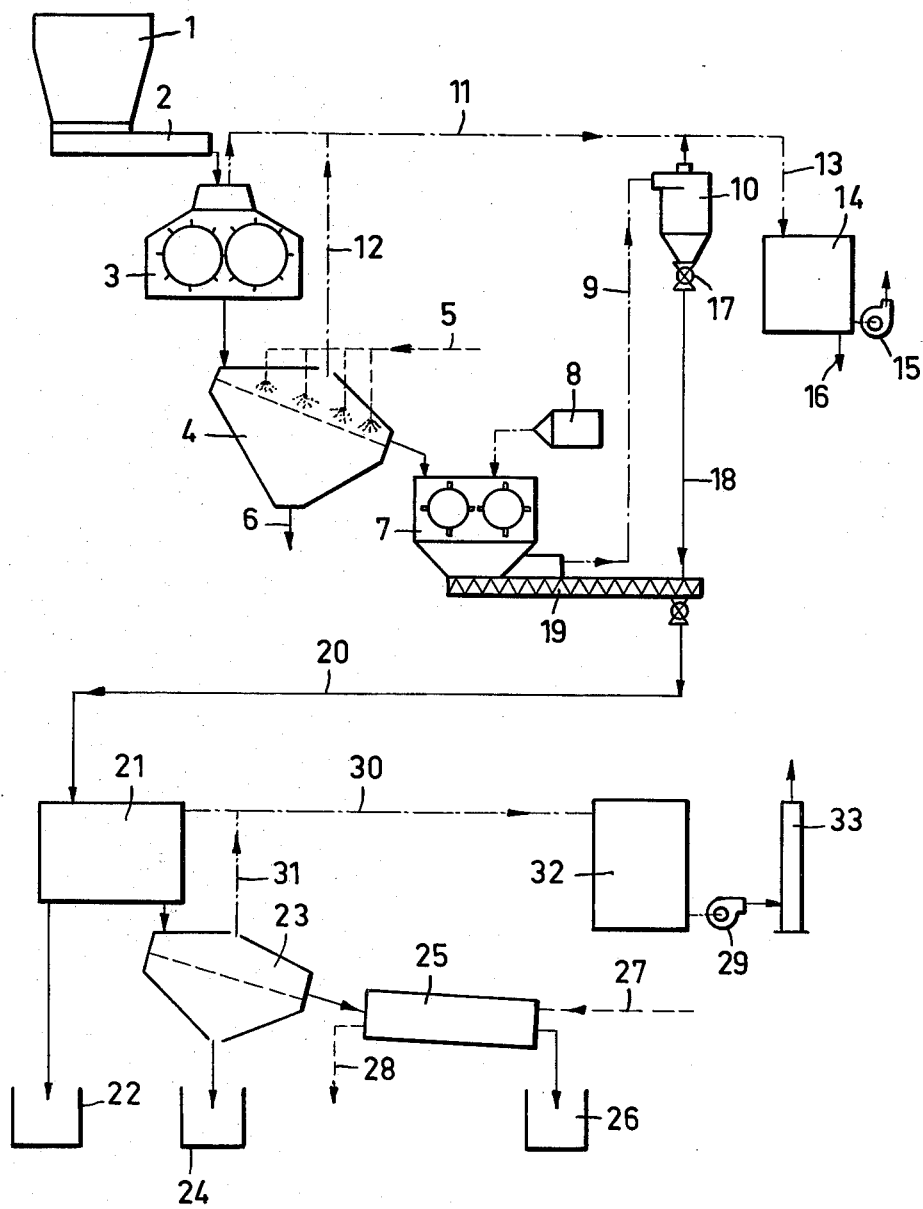

METHOD OF RECOVERING LEAD AND LEAD COMPOUNDS FROM DISCARDED LEAD STORAGE BATTERIES

BACKGROUND OF THE INVENTION

The present invention relates in general to scrapped storage batteries, and in particular to a method for recovering lead and lead compounds from such scrapped batteries. In this method, the storage batteries are first crushed, whereby the resultant crushed pieces are freed of acid and in further steps the solid parts of lead, such as pole terminals and connecting straps, are separated from lead compounds such as lead oxides and lead sulfates, as well as from remaining materials, mostly plastics.

In prior-art methods of this kind, the preliminarily crushed solid parts of the battery are treated by a wet process during which large amounts of washing liquid (water) are consumed, the subsequent purification of which is difficult and expensive (German patent publication No. 12 24 935).

A process is also known during which the storage batteries are opened by means of cutting tools, whereby a substantial part of the acid flows away and the solid parts such as covers, housings, solid plates and separators of the batteries can now be sorted and separated and further treated (German published patent application 22 45 196). This method, however, requires too much manual work and a considerable washing and processing system including, for example, several crushing machines for treating the separate solid parts.

SUMMARY OF THE INVENTION

It is therefore a general object of the present invention to overcome the aforementioned disadvantages.

More particularly, it is an object of the invention to provide an improved method of recovering lead and lead compounds from storage batteries, which requires less manpower, less machinery, and less cleaning water for processing the preliminarily crushed battery parts.

In keeping with these objects, and others which will become apparent hereafter, one feature of the invention resides in the provision of method steps during which the preliminarily crushed battery parts are rinsed in a relatively small amount of alkalic water, thereupon are subjected to further crushing and drying, and in dried condition are classified into three constituents, namely the lead fraction, the lead compound fraction, and the remaining materials. For the secondary crushing and drying process there is preferably used a hammer mill, in particular a double-rotor hammermill, inasmuch as the latter, by changing the rotational speed of the rotors and by exchanging its processing units such as for instance the grates, can be adjusted to different processing requirements for the desired final product; the preliminary crushing is carried out preferably by means of a toothed roller crusher.

The double rotor hammermill is designed and operated in such a manner that the pole terminals and connecting straps of the storage batteries remain uncrushed, the parts of plastic material are crushed into relatively coarse pieces, whereas the cell plates and grates are relatively finely crushed. It is particularly advantageous when the rotors of the hammermill are adjusted for relatively slow rotation towards a circumferential speed of about 40 meters per second, and grates surrounding partially the peripheries of the rotors are constructed with a slot located at the end of the grate furthest away from the material inlet, to discharge the uncrushed lead poles and connecting straps as well as the coarsely crushed plastic pieces. The fine material mainly composed of lead compounds, still contains most of the remaining washing liquid and, due to the relatively low temperature of the drying gases, is not dried completely in the mill. It is entrained by the drying gases and conveyed to a coarse particle separator. Due to the longer dwell interval of the entrained particles in the drying gas stream, the drying process is completed and these dry particles are discharged from the separator to the remaining dried material.

It is of advantage when the drying during the crushing process is carried out by means of drying gases having a temperature between 300° and 350° C. Due to the fact that the preliminarily crushed and rinsed material at the input into the hammer mill still has small traces of sulphuric acid, and that the drying gases have a relatively low temperature, only a negligible amount of sulphuric acid is vaporized. As a consequence, drying gases exhausted from the hammer mill, apart from the entrained solid particles which are easily separated in a coarse separator such as a cyclone for example, contain only few polluting substances which can be removed without difficulties in a gas scrubber, and therefore no corrosion will occur.

According to another step of this invention, the recovered crushed and dried material is fed to a sifter which classifies the same into two fractions, the one consisting of large lead pieces, and the other fraction including finer particles consisting of lead compounds and of plastic pieces. The constituents of the latter fraction behave uniformly in the sifting air stream because the first constituent is of a larger specific weight but of a smaller size whereas the second constituents of plastic are specifically lighter but of a larger size.

The both constituents of the second fraction are subsequently separated one from the other on a screen whereby it is advantageous when the meshes of the screen are not too fine. The reason is that all lead-containing particles must pass through the screen, and it is preferable for some of the generally larger plastic particles to pass through as well, rather than vice versa, for during the further processing of lead oxides and lead sulfides which takes place at high temperatures, any plastic particles will burn. By virtue of the use in accordance with this invention of a combination of sifting and screening, numerous auxiliary devices which have to be employed in prior-art wet lead processing can be dispensed with.

Even in the method of this invention, however, the finest dust of lead compounds cannot be prevented from adhering to the separated fine particles of plastic material. It is possible, however, to wash the plastic pieces in a washing drum for example, where the lead-containing dust is relieved. Also, the used drying gases which apart from entrained vapors of sulfuric acid contain also dust particles, can be purified in a washer after being discharged from the coarse separator. Used washing water from both of these washing devices, as well as from the device for rinsing the preliminarily crushed battery parts, are preferably treated together; in particular, the waste water is neutralized and purified in order to recover the contained sludges of lead compounds.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE illustrates a flow diagram in the device for recovering in accordance with the method of this invention, lead and lead compounds from scrapped lead storage batteries.

DESCRIPTION OF THE PREFERRED EMBODIMENTS

Lead battery scraps to be processed are discharged from a hopper 1 via a conveying chute 2 and fed between two toothed rollers of a coarse crusher 3; the gap between the toothed rollers is adjusted such that all cells of the processed batteries are crushed and acid contained therein can flow out. Light rinsing of the inner walls of the coarse crusher 3 prevents deposition of lead sludge.

The coarsely crushed material from the coarse crusher 3 is discharged onto a screen 4 on which it is subject to further rinsing by a neutralizing liquid, such as alkaline water sprayed from nozzles 5. The coarsely crushed material is thus freed from adhering residual acid. Screen 4 is relatively fine-meshed or is supplemented by a fine-meshed underlying sieve, in order to ensure that minimum fine lead-compound particles are discharged in the stream of used washing water through the water outlet 6.

The coarsely crushed and washed storage battery scraps are subsequently discharged from the screen 4 into a two rotor hammermill 7 where it is selectively crushed and simultaneously dried by a stream of drying gases heated to a temperature between 300° and 350° C. in a burner 8. The drying gases from the mill 7 are conducted via a conduit 9 into a cyclone 10 in which the entrained fine particles consisting mostly of lead compounds such as lead oxide and lead sulfate contained in the battery plates, are separated from the drying gases. The drying gases at the outlet of the cyclone 10 flow together with gases discharged from the roller crusher 3 via conduit 11 and from screen 4 via conduit 12, into a washer 14 downstream of which is a suction fan 15. The washing water in the washer 14 is discharged through an outlet 16.

The crushed and dried material from the hammer mill 7, together with the flashable lead-compound particles separated in cyclone 10 and discharged via rotary gate valve 17 into conduit 18 passes through a screw conveyer 19 and conduit 20 into an air sifter 21. Flashable lead-compound particles separated in cyclone 10 are discharged from the latter via a rotary gate valve 17 and a conduit 18 into a screw conveyor 19 which also delivers crushed and dried material from the hammermill 7 into a conduit 20 leading into an air sifter 21. In the air sifter, due to the dry condition of the material, it is possible to classify the latter relatively easily into two fractions, namely into the heavy lead pieces and into a lighter fraction consisting of specifically heavy but relatively fine-grain lead compounds and of specifically light but larger pieces of plastic material and the like. The heavy lead parts are discharged from the air sifter 21 into a container 22, whereas the constituents of the second fraction are discharged on a relatively fine-meshed screen 23 where the finely divided lead-compound particles ($PbO_2$, $PbSO_4$) polluted with fine plastic particles passes through the screen 23 into a container 24, whereas the oversize consisting essentially of coarse plastic pieces polluted by lead-compound dust, passes into a washing drum 25 where the plastic particles are freed of the lead dust. The plastic pieces are collected in a container 26 for further processing.

Cleaning water supplied into the washing drum 25 through conduit 27 is discharged through conduit 28. Used sifting air stream from the air sifter 21 is sucked out via conduit 30 and air from screen 23 is sucked out via conduit 31 into a dust filter 32 and therefrom is discharged by means of a suction blower 29 via a stack 33 into the outer atmosphere. Outlets 6, 16 and 28 for cleaning water, if desired, can be connected to a device for recovering lead compounds or to a device for neutralizing acid residues.

It will be understood that each of the elements described above, or two or more together, may also find a useful application in other types of constructions differing from the types described above.

While the invention has been illustrated and described as embodied in a method for recovering lead from lead storage batteries, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of recovering lead and lead compounds from scrapped storage batteries, comprising the steps of preliminarily crushing the batteries to discharge acid therefrom; rinsing the crushed pieces by a minimum amount of a liquid preferably alkaline water; further crushing the coarsely crushed pieces while simultaneously drying the same at a relatively low temperature at which only a negligible amount of the residual acid is vaporized; and thereafter classifying the crushed dry material into the coarse lead fraction, a fraction of fine lead compounds and remaining materials of low specific weight, mostly plastics.

2. A method as defined in claim 1, wherein said crushing and drying step is carried out in a two-rotor hammermill, the rotors of which are driven at a relatively low speed in the range of about 40 meters per second on their circumference, said hammermill having a top inlet and a bottom outlet, grates provided between said rotors and said outlet and having a slot at the end of the grate furthest away from the said inlet through which non-crushed-parts of the battery are discharged.

3. A method as defined in claim 2, wherein said step of crushing and drying includes the exposure of material in said hammermill to a stream of drying gases having temperature between 300° and 350° C.

4. A method as defined in claim 3, further including the step of discharging said stream of drying gases together with entrained finely pulverized particles of lead compounds into a separator and thereupon admixing the separated fine lead-compound particles to crushed and dry particles discharged from said outlet of the hammermill.

5. A method as defined in claim 4, wherein said classifying step includes the separation of crushed and dry material into two fractions, one fraction including coarse lead parts and the second fraction including a mixture of fine lead compounds and of plastic pieces.

6. A method as defined in claim 5, wherein said two fractions are separated in an air sifter.

7. A method as defined in claim 5, wherein said second fraction is fed on a screen for separating finely divided particles of lead compounds from coarser particles of plastics.

8. A method as defined in claim 7, wherein said plastic particles are washed in a washing device for removing adhering dust of lead compounds.

9. A method as defined in claim 8, wherein sludges contained in the used washing water are recovered and the water is neutralized and purified.

10. A method as defined in claim 4, wherein used drying gases upon their discharge from the separator are purified in a washing device.

* * * * *